April 21, 1953 C. J. OVERBECK ET AL 2,635,527
DEEP FRYING STRAINER
Filed May 2, 1950
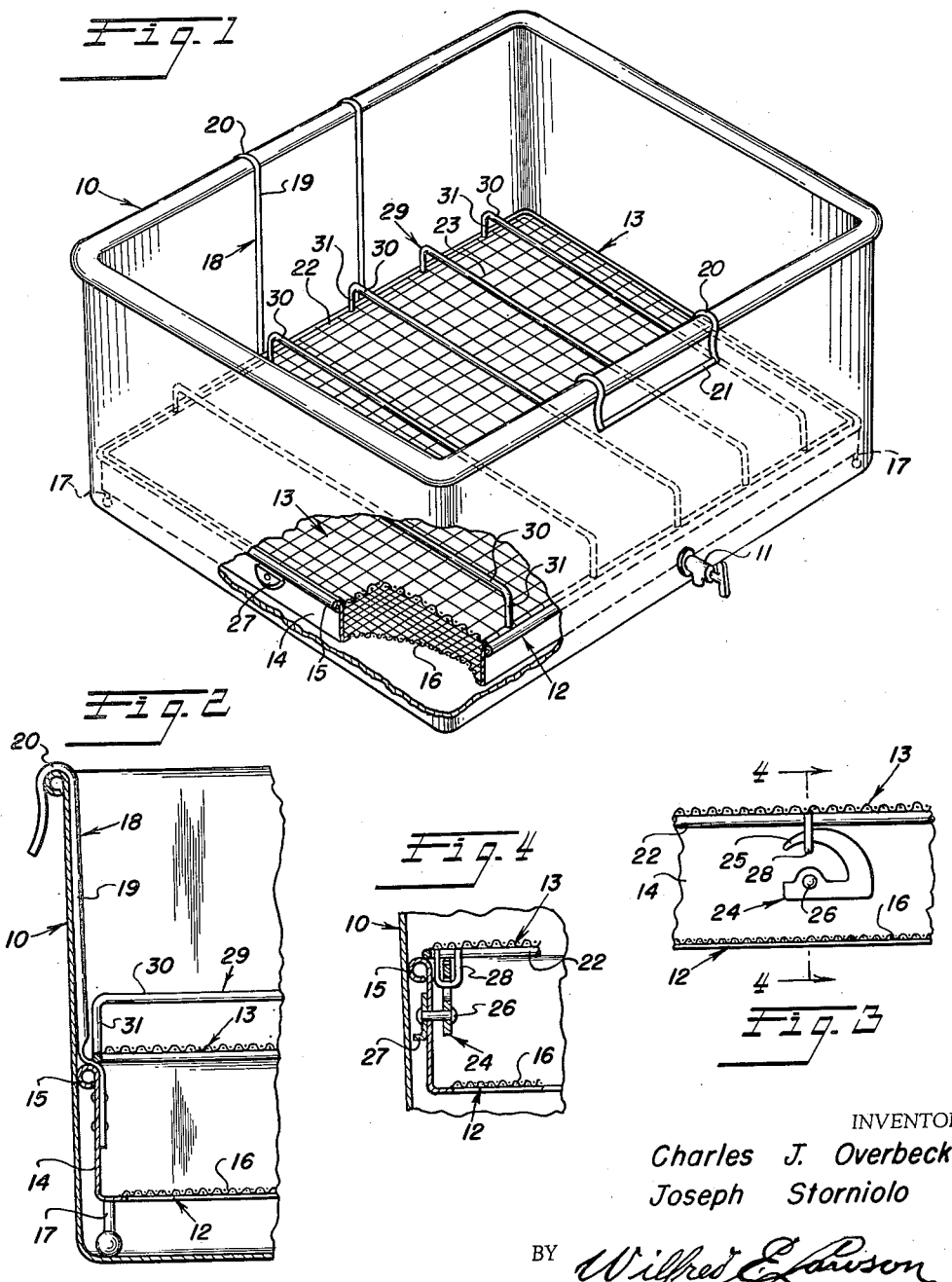
INVENTORS
Charles J. Overbeck
Joseph Storniolo
BY Wilfred E. Lawson
ATTORNEY Patented Apr. 21, 1953

2,635,527

UNITED STATES PATENT OFFICE 2,635,527

DEEP FRYING STRAINER

Charles J. Overbeck and Joseph Storniolo,
Philadelphia, Pa.

Application May 2, 1950, Serial No. 159,398

3 Claims. (Cl. 99—408)

This invention relates to culinary apparatus and is directed particularly to improvements in deep fat frying apparatus, more particularly to apparatus known as "Fryolators."

In fryers of the character referred to, a depth of fat is used in which food is immersed for frying, and the fat soon becomes unusable because of food particles dropping therein from the food being cooked, and must be then drawn off and strained to fit it for further use.

An object of the present invention is to provide an insert strainer unit for such frying devices by means of which food particles may be easily and quickly strained from the cooking oil or fat without having to draw it off from the cooking receptacle, but merely by withdrawing the strainer unit, by which action all food particles will be removed, after which the strainer unit may be cleaned and replaced in the receptacle and the oil used again.

Another object is to provide a strainer unit of the character stated having two separable vertically spaced screens of different size mesh, the screen of larger mesh being above the other to catch large food particles, whereby such larger particles may be removed at more frequent intervals than the smaller particles which pass through and are caught on the smaller mesh bottom screen.

Still another object is to provide a straining unit of the double screen form described, wherein the top screen has spaced, elevated bars thereacross upon which to rest a frying tray, so that the tray will not contact the screen surface upon which small food particles may have been caught.

The invention will be best understood from the following detailed description taken in association with the accompanying drawing forming a part of the specification, with the understanding, however, that minor changes and modifications may be made in the invention so long as such changes do not depart materially from the scope of the appended claims.

In the drawing:

Figure 1 is a view in perspective of a deep fat fryer receptacle showing therein the strainer constructed in accordance with the invention, portions of the fryer receptacle and strainer being broken away;

Figure 2 is a vertical section through one side of the receptacle and the strainer construction;

Figure 3 is a detail view showing the latching means for the top screen;

Figure 4 is a section taken substantially on the line 4—4 of Figure 3.

Referring now more particularly to the drawing, the numeral 10, generally designates a deep fat frying receptacle, such as is generally known as a "Fryolator," such receptacles being usually equipped with an oil or fat draw-off means 11.

In accordance with the present invention there is provided a double screen strainer unit comprising a bottom strainer, generally designated 12, and a top strainer, generally designated 13, which unit is formed to be lowered into the receptacle, as shown, for use.

The bottom strainer 12 comprises a frame 14 of the same form as the receptacle and is of slightly smaller overall dimensions than the inside dimensions of the receptacle. This frame may be made of suitable, flat metal and has the top edge thereof, along each side, outwardly rolled as at 15. This rolled edge fits snugly against the inside wall of the receptacle and prevents particles of food from passing down between the wall and the strainer.

Secured across the bottom of the frame 14 is a wire screen 16 of relatively fine mesh, which catches small bits or particles of food which would normally go to the bottom of the receptacle.

The bottom screen is prevented from resting directly upon the bottom of the receptacle by the four legs 17 which are attached at each corner of the frame and rest upon the receptacle bottom.

In addition to the supporting legs, each of two opposite sides of the receptacle has attached thereto a lift handle, generally designated 18. Each of these handles comprises the two vertical bars 19, each of which is secured at one end to a side of the frame 14 and extends upward to and terminates in a hook 20, which engages across the top edge of the receptacle, as shown, and these hooks are joined together by the horizontal handle bar 21.

By means of the lift handles, the screen, or screens, may be easily lifted out of, or replaced in, the receptacle.

The top screen 13 comprises a rectangular frame 22 covered by a wire screen 23, of coarser or larger mesh than the bottom screen 16.

The screen 13 rests upon the top of the frame 14 of the lower screen and is secured thereto by a pair of rotary catches 24 carried by opposite sides of the frame 14. These catches may be of any suitable character, but are here shown as comprising an arcuate hook 25, supported against the inner side of the frame by a pin 26 which passes through to the outside of the frame where it carries a button or knob 27, by which the hook is turned.

The frame 22 of the top screen, above each hook 25, may carry a depending eye or loop 28, through which the point of the hook engages, to draw the top screen down tightly onto the frame of the bottom screen, thus joining the two screens into an integral unit which may be put in and taken out as such.

When only the top screen is to be cleaned the unit may be raised so that the hooks can be turned to release the top screen, which may then be taken out while the bottom screen is replaced.

In order that the cooking basket or tray, in which the food to be cooked is lowered into the hot oil or grease, may not rest directly upon the wire mesh of the top screen, there are provided a number of arch bars 29, each of which comprises a horizontal portion 30, and end legs 31, which are joined to and extend up from a side of the frame 22. Thus the portions 30 extend horizontally across, and are spaced above the screen mesh 23, of the top screen, to support a frying basket. Such bars may also be employed as a convenient means for lifting the top screen, when desired.

From the foregoing it will be seen that there is provided by the present invention, a novel and desirable straining means for use in a deep fat fryer, by which the frying fat or oil can be easily and quickly cleansed of food particles without having to be drawn off from the receptacle, as is necessary in the fryers of the character at present in use.

We claim:

1. In a strainer for deep frying, an open frame of sheet metal having its top edge outwardly rolled for contact with the sides of a utensil and a relatively narrow flange inturned from its lower edge, a sheet of wire mesh supported by said flange within said frame, and elongate members at opposite sides of said frame and each secured at one end to the inside of the frame and extending laterally across said rolled edge and rising therefrom with its outer side in the vertical plane of the outside of the rolled edge and formed at its other end for engagement with the lip of the utensil to suspend the strainer in place, the said members each comprising a length of wire bent into U-form an equal distance to each side of its center and having a portion of its upper end outwardly and downwardly bent to form a hook to be engaged over the lip of the utensil.

2. In a strainer for deep frying, an open frame of sheet metal having its top edge outwardly rolled for contact with the sides of a utensil and a relatively narrow flange inturned from its lower edge, a sheet of wire mesh supported by said flange within said frame, and elongate members at opposite sides of said frame and each secured at one end to the inside of the frame and extending laterally across said rolled edge and rising therefrom with its outer side in the vertical plane of the outside of the rolled edge and formed at its other end for engagement with the lip of the utensil to suspend the strainer in place, a second sheet of wire mesh removably supported on the rolled top edge of said frame, and a series of parallel inverted U-shaped elements mounted over and supported from opposite side edges of said second screen and upon which a second utensil may be supported for cooking or warming purposes, during the deep frying of foodstuff supported on the first wire mesh sheet.

3. In a strainer for deep frying, an open frame of sheet metal having its top edge outwardly rolled for contact with the sides of a utensil and a relatively narrow flange inturned from its lower edge, a sheet of wire mesh supported by said flange within said frame, and elongate members at opposite sides of said frame and each secured at one end to the inside of the frame and extending laterally across said rolled edge and rising therefrom with its outer side in the vertical plane of the outside of the rolled edge and formed at its other end for engagement with the lip of the utensil to suspend the strainer in place, a second sheet of wire mesh and a frame therefor removably supported on the rolled top edge of said first frame, and a coacting means between the first frame and the frame of the said second sheet for latching said second sheet in place upon said rolled edge during use, said latching means comprising a pivot pin carried by and extending through the frame below said rolled edge, an arcuate hook secured to the inner end of said pin, a button secured to the outer end of the pin and lying in the vertical space defined by the adjacent frame and a vertical plane passing across the perimeter of the adjacent rolled edge, and a depending eye carried by the frame of the second named sheet.

CHARLES J. OVERBECK.
JOSEPH STORNIOLO.

References Cited in the file of this patent

UNITED STATES PATENTS

| Number | Name | Date |
| --- | --- | --- |
| 237,983 | Kenworthy | Feb. 22, 1881 |
| 902,181 | Tidow | Oct. 27, 1908 |
| 924,981 | Gwinn et al. | June 15, 1909 |
| 979,388 | Ericson | Dec. 20, 1910 |
| 1,260,720 | Shattuck | Mar. 26, 1918 |
| 1,266,816 | Kinnie | May 21, 1918 |
| 1,272,222 | Clayton | July 9, 1918 |
| 1,300,565 | Bowers et al. | Apr. 15, 1919 |
| 1,345,342 | Beall | July 6, 1920 |
| 2,234,741 | Schurig | Mar. 11, 1941 |
| 2,318,842 | Eaton | May 11, 1943 |

FOREIGN PATENTS

| Number | Country | Date |
| --- | --- | --- |
| 567,235 | France | Feb. 27, 1924 |